(12) United States Patent
Hashizume et al.

(10) Patent No.: US 7,260,496 B2
(45) Date of Patent: Aug. 21, 2007

(54) PRESSURE DETECTOR AND METHOD OF DIAGNOSING BLOCKAGE OF IMPULSE LINES

(75) Inventors: Takumi Hashizume, Chiba (JP); Tetsuya Wakui, Osaka (JP); Nobuo Miyaji, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/442,573

(22) Filed: May 25, 2006

(65) Prior Publication Data

US 2006/0278006 A1  Dec. 14, 2006

(30) Foreign Application Priority Data

May 27, 2005  (JP) .............................. 2005-154914

(51) Int. Cl.
*G08B 21/00*  (2006.01)
(52) U.S. Cl. .......................... 702/138; 73/706; 73/707; 73/708; 73/3; 73/4 R; 340/608; 340/609; 340/610; 340/611; 340/626; 137/554; 137/557
(58) Field of Classification Search ................ 702/138; 73/706–708, 3, 4 R; 340/608–611; 137/554, 137/557; 318/676
See application file for complete search history.

(56) References Cited

U.S. PATENT DOCUMENTS 5,680,109 A * 10/1997 Lowe et al. ................ 340/608

FOREIGN PATENT DOCUMENTS

JP  2004-132817  4/2004
JP  2005-274501  10/2005

OTHER PUBLICATIONS

Amadi-Echendu, et al., "Signal Analysis Applied to Detect Blockages in Pressure and Differential Pressure Measurement Systems," IEEE, pp. 741-744 (1994).
Extended European Search Report dated Sep. 20, 2006.

* cited by examiner

*Primary Examiner*—Hal Wachsman
*Assistant Examiner*—Sujoy Kundu
(74) *Attorney, Agent, or Firm*—John J. Penny, Jr.; Edwards Angell Palmer & Dodge LLP

(57) ABSTRACT

A pressure detector for detecting a high side pressure from a high pressure side impulse line and a low side pressure from a low pressure side impulse line includes a high side pressure variance calculating section for calculating a high side pressure variance from a high side pressure fluctuation calculated from a high side pressure signal, a low side pressure variance calculating section for calculating a low side pressure variance from a low side pressure fluctuation calculated from a low side pressure signal, a rate calculating section for calculating a variable according to a ratio of the high side pressure variance to the low side pressure variance, and a determining section for determining blockage of the high pressure side impulse line or blockage of the low pressure side impulse line based on a value of the variable.

22 Claims, 4 Drawing Sheets

FIG. 4

| DIAGNOSIS OF BLOCKAGE / DIAGNOSIS VARIABLE | NORMAL | BLOCKAGE OF ONLY HIGH PRESSURE SIDE IMPULSE LINE | BLOCKAGE OF ONLY LOW PRESSURE SIDE IMPULSE LINE | BLOCKAGE OF BOTH OF HIGH AND LOW PRESSURE SIDE IMPULSE LINES |
|---|---|---|---|---|
| $Z1 = V_H / V_X$ | 0.25~0.9 | 0~0.25 | 0.9~1.1 | – |
| $Z2 = V_L / V_X$ | 0.25~0.9 | 0.9~1.1 | 0~0.25 | – |
| $Z3 = V_H / V_L$ | 0.25~1.75 | 0~0.25 | 1.75~ | – |
| $Z4 = V_H / (V_L + V_X)$ | 0.25~0.9 | 0~0.25 | 0.9~1.1 | – |
| $Z5 = V_L / (V_H + V_X)$ | 0.25~0.9 | 0.9~1.1 | 0~0.25 | – |
| $Z6 / Z6s$ | 0.015~ | – | – | 0~0.015 |
| $Z7 / Z7s$ | 0.015~ | – | – | 0~0.015 |

PRESSURE DETECTOR AND METHOD OF DIAGNOSING BLOCKAGE OF IMPULSE LINES

This application claims foreign priority based on Japanese Patent application No. 2005-154914, filed May 27, 2005, the content of which is incorporated herein by reference in its entirety.

BACKGROUND OF THE INVENTION

1. Field of the Invention

The present invention relates to a differential pressure transmitter (pressure detector) and a method of diagnosing blockage of impulse lines which are connected with a high pressure side and a low pressure side by using a differential pressure signal and a static pressure signal. Particularly, the present invention relates to a differential pressure transmitter (pressure detector) and a method of diagnosing blockage of impulse lines of a high pressure side and a low pressure side respectively.

2. Description of the Related Art

There is a related differential pressure transmitter (pressure transmitter) for generating and transmitting a differential pressure signal and a static pressure signal from a high side pressure and a low side pressure, and detecting a blockage state of one or both of impulse lines from a correlation between a fluctuation of the differential pressure signal and a fluctuation of the static pressure signal (refer to, for example, JP-A-2004-132817). Further, a result of diagnosing the blockage is transmitted by a predetermined method.

However, the related differential pressure transmitter has a problem that blockage of only a high pressure side impulse line and blockage of only a low pressure side impulse line cannot be diagnosed.

With regard to such a problem, according to JP-A-2005-274501, blockage of a high pressure side impulse line and blockage of a low pressure side impulse line can simply and accurately be diagnosed.

Further, the fluctuation of pressure is influenced by a flow rate of a process, and therefore, a problem arises that it is difficult to diagnose blockage of the impulse lines.

In details, when the flow rate of the process is small, a value of an fluctuation of a pressure tends to be small. Therefore, it is difficult to determine whether the value of the fluctuation of the pressure is small since the impulse line is blocked, or the value of the fluctuation of the pressure is small since the flow rate of process is small.

Therefore, according to the related differential pressure transmitter, a reference value for diagnosing blockage is switched at each time of setting the flow rate of the process. Therefore, according to the related differential pressure transmitter, it is necessary to change the reference of diagnosing blockage in accordance with a value of the flow rate of the process, and thus a problem arises that maintenance cost is required.

SUMMARY OF THE INVENTION

The present invention has been made in view of the above circumstances, and provides a differential pressure transmitter (pressure detector) and a method of diagnosing blockage of impulse lines, capable of simply and accurately diagnosing blockage of impulse lines without being influenced by a flow rate of a process.

In some implementations, a pressure detector of the invention for detecting a high side pressure from a high pressure side impulse line and a low side pressure from a low pressure side impulse line comprises:

a differential pressure calculating section for calculating a differential pressure signal (X) based on a differential pressure of the high side pressure and the low side pressure;

a differential pressure fluctuation calculating section for calculating a differential pressure fluctuation ($F_X(i)$) from the differential pressure signal (X);

a differential pressure variance calculating section for calculating a differential pressure variance ($V_X$) from the differential pressure fluctuation ($F_X(i)$);

a high side pressure calculating section for calculating a high side pressure signal ($Y_H$) based on the high side pressure;

a high side pressure fluctuation calculating section for calculating a high side pressure fluctuation ($F_H(i)$) from the high side pressure signal ($Y_H$);

a high side pressure variance calculating section for calculating a high side pressure variance ($V_H$) from the high side pressure fluctuation ($F_H(i)$);

a low side pressure calculating section for calculating a low side pressure signal ($Y_L$) based on the low side pressure;

a low side pressure fluctuation calculating section for calculating a low side pressure fluctuation ($F_L(i)$) from the low side pressure signal ($Y_L$);

a low side pressure variance calculating section for calculating a low side pressure variance ($V_L$) from the low side pressure fluctuation ($F_L(i)$);

a first rate calculating section for calculating a first diagnosis variable (Z1) according to a ratio of the high side pressure variance ($V_H$) to the differential pressure variance ($V_X$);

a second rate calculating section for calculating a second diagnosis variable (Z2) according to a ratio of the low side pressure variance ($V_L$) to the differential pressure variance ($V_X$);

a third rate calculating section for calculating a third diagnosis variable (Z3) according to a ratio of the high side pressure variance ($V_H$) to the low side pressure variance ($V_L$);

a fourth rate calculating section for calculating a fourth diagnosis variable (Z4) according to a ratio of the high side pressure variance ($V_H$) to a sum of the low side pressure variance ($V_L$) and the differential pressure variance ($V_X$);

a fifth rate calculating section for calculating a fifth diagnosis variable (Z5) according to a ratio of the low side pressure variance ($V_L$) to a sum of the high side pressure variance ($V_H$) and the differential pressure variance ($V_X$);

a first product calculating section for calculating a first variable (Z6) according to a product of the differential pressure variance ($V_X$), the high pressure side variance ($V_H$) and the low side pressure variance ($V_L$);

a second product calculating section for calculating a second variable (Z7) according to a product of the differential pressure fluctuation ($F_X(i)$), the high side pressure fluctuation ($F_H(i)$) and the low side pressure fluctuation ($F_L(i)$);

a first determining section for determining blockage of the high pressure side impulse line or blockage of the low pressure side impulse line based on a value of the first diagnosis variable (Z1);

a second determining section for determining blockage of the high pressure side impulse line or blockage of the low pressure side impulse line based on a value of the second diagnosis variable (Z2);

a third determining section for determining blockage of the high pressure side impulse line or blockage of the low pressure side impulse line based on a value of the third diagnosis variable (Z3);

a fourth determining section for determining blockage of the high pressure side impulse line or blockage of the low pressure side impulse line based on a value of the fourth diagnosis variable (Z4);

a fifth determining section for determining blockage of the high pressure side impulse line or blockage of the low pressure side impulse line based on a value of the fifth diagnosis variable (Z5);

a sixth determining section for determining blockage of both the high pressure side impulse line and the low pressure side impulse line based on a value of the first variable (Z6); and a seventh determining section for determining blockage of both of the high pressure side impulse line and the low pressure side impulse line based on a value of the second variable (Z7).

In the pressure detector of the invention, the differential pressure calculating section has a constant ($A_D$) of a calculating equation in which the differential pressure signal (X) is not influenced by a change in the high side pressure and a change in the low side pressure, the high side pressure calculating section has a constant ($A_H$) of a calculating equation in which the high side pressure signal ($Y_X$) is not influenced by the change in the low side pressure, and the low side pressure calculating section has a constant ($A_L$) of a calculating equation in which the low side pressure signal ($Y_L$) is not influenced by the change in the high side pressure.

The differential pressure transmitter of the invention further comprises:

a first storing section for storing a value (Z6s) of the first variable (Z6) when the blockage is not occurred, wherein the sixth determining section determines the blockage of both the high pressure side impulse line and the low pressure side impulse line based on a value of a sixth diagnosis variable (Z6/Z6s) according to a ratio of the first variable (Z6) to the value (Z6s) stored in the first storing section.

The pressure detector of the invention further comprising:

a second storing section for storing a value (Z7s) of the second variable (Z7) when the blockage is not occurred, wherein the seventh determining section determines the blockage of both the high pressure side impulse line and the low pressure side impulse line based on a value of a seventh diagnosis variable (Z7/Z7s) according to a ratio of the second variable (Z7) to the value (Z7s) stored in the second storing section.

The pressure detector of the invention further comprises:

at least two oscillating-type-sensors each of which detects a pressure and which are formed on a element; and a counter for counting a frequency ($F_c$) of one output of the oscillating-type-sensors and a frequency ($F_r$) of other output of the oscillating-type-sensors respectively, wherein the differential pressure calculating section, the high side pressure calculating section and the low side pressure calculating section satisfy equations including $$X = (F_C/F_{co})^2 - 1 - A_D \cdot \{(F_r/F_{ro})^2 - 1\} \quad (A)$$

$$Y_H = (F_C/F_{co})^2 - 1 + A_H \cdot \{(F_r/F_{ro})^2 - 1\} \quad (B)$$

$$Y_L = (F_C/F_{co})^2 - 1 + A_L \cdot \{(F_r/F_{ro})^2 - 1\} \quad (C)$$

where

X is the differential pressure signal, $Y_H$ is the high side pressure signal, $Y_L$ is the low side pressure signal, $A_D$, $A_H$ and $A_L$ are the constants, $F_c$ is the frequency of the output of the one of the oscillating-type-sensors, $F_{co}$ is a frequency of the output of the one of the oscillating-type-sensors in a state of a reference pressure, $F_r$ is the frequency of the output of the other of the oscillating-type-sensors, and $F_{ro}$ is a frequency of the output of the other of the oscillating-type-sensors in the state of the reference pressure.

In the pressure detector of the invention, the pressure fluctuation ($F_X(i)$) includes a difference between a differential pressure signal (X(i)) generated at i th time and a differential pressure signal ((X(i-1)) generated at (i-1) th time, the high side pressure fluctuation ($F_H(i)$) includes a difference between a high side pressure signal ($Y_H(i)$) generated at i th time and a high side pressure signal ($Y_H(i-1)$) generated at (i-1) th time, the low side pressure fluctuation ($F_L(i)$) includes a difference between a low side pressure signal ($Y_L(i)$) generated at i th time and a low side pressure signal ($Y_L(i-1)$) generated at (i-1) th time, the differential pressure variance ($V_X$) includes a mean square of the differential pressure fluctuations ($F_X(i)$) for N samples, the high side pressure variance ($V_H$) includes a mean square of the high side pressure fluctuations ($F_H(i)$) for N samples, and the low side pressure variance ($V_L$) includes a mean square of the low side pressure fluctuations ($F_L(i)$) for N samples.

In some implementations, a pressure detector of the invention for detecting a high side pressure from a high pressure side impulse line and a low side pressure from a low pressure side impulse line comprises:

a differential pressure calculating section for calculating a differential pressure signal based on a differential pressure between the high side pressure and the low side pressure;

a differential pressure fluctuation calculating section for calculating a differential pressure fluctuation from the differential pressure signal;

a differential pressure variance calculating section for calculating a differential pressure variance from the differential pressure fluctuation;

a high side pressure calculating section for calculating a high side pressure signal based on the high side pressure;

a high side pressure fluctuation calculating section for calculating a high side pressure fluctuation from the side pressure signal;

a high side pressure variance calculating section for calculating a high side pressure variance from the high side pressure fluctuation;

a rate calculating section for calculating a diagnosis variable according to a ratio of the high side pressure variance to the differential pressure variance; and a determining section for determining blockage of the high pressure side impulse line or blockage of the low pressure side impulse line based on a value of the diagnosis variable.

In some implementations, a differential pressure transmitter of the invention for detecting a high side pressure from a high pressure side impulse line and a low side pressure from a low pressure side impulse line comprises:

a differential pressure calculating section for calculating a differential pressure signal based on a differential pressure between the high side pressure and the low side pressure;

a differential pressure fluctuation calculating section for calculating a differential pressure fluctuation from the differential pressure signal;

a differential pressure variance calculating section for calculating a differential pressure variance from the differential pressure fluctuation;

a low side pressure calculating section for calculating a low side pressure signal based on the low side pressure;

a low side pressure fluctuation calculating section for calculating a low side pressure fluctuation from the low side pressure signal;

a low side pressure variance calculating section for calculating a low side pressure variance from the low side pressure fluctuation;

a rate calculating section for calculating a diagnosis variable according to a ratio of the low side pressure variance to the differential pressure variance; and a determining section for determining blockage of the high pressure side impulse line or blockage of the low pressure side impulse line based on a value of the diagnosis variable.

In some implementations, a differential pressure transmitter of the invention for detecting a high side pressure from a high pressure side impulse line and a low side pressure from a low pressure side impulse line comprises:

a high side pressure calculating section for calculating a high side pressure signal based on the high side pressure;

a high side pressure fluctuation calculating section for calculating a high side pressure fluctuation from the high side pressure signal;

a high side pressure variance calculating section for calculating a high side pressure variance from the high side pressure fluctuation;

a low side pressure calculating section for calculating a low side pressure signal based on the low side pressure;

a low side pressure fluctuation calculating section for calculating a low side pressure fluctuation from the low side pressure signal;

a low side pressure variance calculating section for calculating a low side pressure variance from the low side pressure fluctuation;

a rate calculating section for calculating a diagnosis variable according to a ratio of the high side pressure variance to the low side pressure variance; and a determining section for determining blockage of the high pressure side impulse line or blockage of the low pressure side impulse line based on a value of the diagnosis variable.

In some implementations, a pressure detector of the invention for detecting a high side pressure from a high pressure side impulse line and a low side pressure from a low pressure side impulse line comprises:

a differential pressure calculating section for calculating a differential pressure signal based on a differential pressure between the high side pressure and the low side pressure;

a differential pressure fluctuation calculating section for calculating a differential pressure fluctuation from the differential pressure signal;

a differential pressure variance calculating section for calculating a differential pressure variance from the differential pressure fluctuation;

a high side pressure calculating section for calculating a high side pressure signal based on the high side pressure;

a high side pressure fluctuation calculating section for calculating a high side pressure fluctuation from the high side pressure signal;

a high side pressure variance calculating section for calculating a high side pressure variance from the high side pressure fluctuation;

a low side pressure calculating section for calculating a low side pressure signal based on the low side pressure;

a low side pressure fluctuation calculating section for calculating a low side pressure fluctuation from the low side pressure signal;

a low side pressure variance calculating section for calculating a low side pressure variance from the low side pressure fluctuation;

a variable calculating section for calculating a variable based on the high side pressure variance, the low side pressure variance and the differential pressure variance; and a determining section for determining at least one blockage of the high pressure side impulse line and blockage of the low pressure side impulse line based on a value of the variable.

In the pressure detector of the invention, the variable calculating section calculates the variable according to a ratio of the high side pressure variance to a sum of the low side pressure variance and the differential pressure variance.

In the pressure detector of the invention, the variable calculating section calculates the variable according to a ratio of the low side pressure variance to a sum of the high side pressure variance and the differential pressure variance.

In the pressure detector of the invention, the variable calculating section calculates the variable according to a product of the differential pressure variance, the high side pressure variance and the low side pressure variance, and the determining section determines the blockage of both the high pressure side impulse line and the low pressure side impulse line based on a value of the variable.

In some implementations, a pressure detector of the invention for detecting a high side pressure from a high pressure side impulse line and a low side pressure from a low pressure side impulse line comprises:

a differential pressure calculating section for calculating a differential pressure signal based on a differential pressure between the high side pressure and the low side pressure;

a differential pressure fluctuation calculating section for calculating a differential pressure fluctuation from the differential pressure signal;

a high side pressure calculating section for calculating a high side pressure signal based on the high side pressure;

a high side pressure fluctuation calculating section for calculating a high side pressure fluctuation from the high side pressure signal;

a low side pressure calculating section for calculating a low side pressure signal based on the low side pressure;

a low side pressure fluctuation calculating section for calculating a low side pressure fluctuation from the low side pressure signal;

a product calculating section for calculating a variable according to a product of the differential pressure fluctuation, the high side pressure fluctuation and the low side pressure fluctuation; and a determining section for determining blockage of both the high pressure side impulse line and the low pressure side impulse line based on a value of the variable.

In some implementations, a method of the invention of diagnosing blockage of impulse lines connected to a pressure detector for detecting a high side pressure and a low side pressure, comprises:

calculating a differential pressure signal based on a differential pressure between the high side pressure and the low side pressure;

calculating a differential pressure fluctuation from the differential pressure signal;

calculating a differential pressure variance from the differential pressure fluctuation;

calculating a high side pressure signal based on the high side pressure;

calculating a high side pressure fluctuation from the high side pressure signal;

calculating a high side pressure variance from the high side pressure fluctuation;

calculating a diagnosis variable according to a ratio of the high side pressure variance to the differential pressure variance; and determining blockage of a high pressure side impulse line or blockage of a low pressure side impulse line based on a value of the diagnosis variable.

In some implementations, a method of the invention of diagnosing blockage of impulse lines connected to a pressure detector for detecting a high side pressure and a low side pressure comprises:

calculating a differential pressure signal based on a differential pressure between the high side pressure and the low side pressure;

calculating a differential pressure fluctuation from the differential pressure signal;

calculating a differential pressure variance from the differential pressure fluctuation;

calculating a low side pressure signal based on the low side pressure;

calculating a low side pressure fluctuation from the low side pressure signal;

calculating a low side pressure variance from the low side pressure fluctuation;

calculating a diagnosis variable according to a ratio of the low side pressure variance to the differential pressure variance; an determining blockage of a high pressure side impulse line or blockage of a low pressure side impulse line based on a value of the diagnosis variable.

In some implementations, a method of the invention of diagnosing blockage of impulse lines connected to a pressure detector for detecting a high side pressure and a low side pressure, comprises:

calculating a high side pressure signal based on the high side pressure;

calculating a high side pressure fluctuation from the high side pressure signal;

calculating a high side pressure variance from the high side pressure fluctuation;

calculating a low side pressure signal based on the low side pressure;

calculating a low side pressure fluctuation from the low side pressure signal;

calculating a low pressure variance from the low side pressure fluctuation;

calculating a diagnosis variable according to a ratio of the high side pressure variance to the low side pressure variance; and determining blockage of a high pressure side impulse line or blockage of a low pressure side impulse line based on a value of the diagnosis variable.

In some implementations, a method of the invention of diagnosing blockage of impulse lines connected to a pressure detector for detecting a high side pressure and a low side pressure, comprises:

calculating a differential pressure signal based on a differential pressure between the high side pressure and the low side pressure;

calculating a differential pressure fluctuation from the differential pressure signal;

calculating a differential pressure variance from the differential pressure fluctuation;

calculating a high side pressure signal based on the high side pressure;

calculating a high side pressure fluctuation from the high side pressure signal;

calculating a high side pressure variance from the high side pressure fluctuation;

calculating a low pressure side signal based on the low side pressure;

calculating a low side pressure fluctuation from the low side pressure signal;

calculating a low side pressure variance from the low side pressure fluctuation;

calculating a variable based on the differential pressure variance, the high side pressure variance and the low side pressure variance; and determining at least one blockage of a high pressure side impulse line and blockage of a low pressure side impulse line based on a value of the variable.

In the method of the invention, the variable according to a ratio of the high side pressure variance to a sum of the low side pressure variance and the differential pressure variance is calculated.

In the method of the invention, the variable according to a ratio of the low side pressure variance to a sum of the high side pressure variance and the differential pressure variance is calculated.

In the method of the invention, the variable according to a product of the differential pressure variance, the high side pressure variance and the low side pressure variance is calculated, and the blockage of both the high pressure side impulse line and the low pressure side impulse line is determined based on a value of the variable.

In some implementations, a method of the invention of diagnosing blockage of impulse lines connected to a pressure detector for detecting a high side pressure and a low side pressure, the method comprising:

calculating a differential pressure signal based on a differential pressure between the high side pressure and the low side pressure;

calculating a differential pressure fluctuation from the differential pressure signal;

calculating a high side pressure signal based on the high side pressure;

calculating a high side pressure fluctuation from the high side pressure signal;

calculating a low side pressure signal based on the low side pressure;

calculating a low side pressure fluctuation from the low side pressure signal;

calculating a variable according to a product of the differential pressure fluctuation, the high side pressure fluctuation and the low side pressure fluctuation; and determining blockage of both a high pressure side impulse line and a low pressure side impulse line based on a value of the variable.

According to the invention, there can be provided a differential pressure transmitter (pressure detector) and a method of diagnosing blockage of impulse lines, capable of diagnosing blockage of a impulse line simply and accurately without being influenced by a flow rate of a process.

Further, according to the invention, there can be provided a differential pressure transmitter (pressure detector) and a method of diagnosing blockage of impulse lines, which are capable of respectively diagnosing occurrence of blockage of a high pressure side impulse line and occurrence of blockage of a low pressure side impulse line simply and accurately.

BRIEF DESCRIPTION OF THE DRAWINGS

FIG. 4 is a determination table for diagnosing blockage in an embodiment of FIG. 1.

DESCRIPTION OF THE PRFERRED EMBODIMENTS

Figure 1:
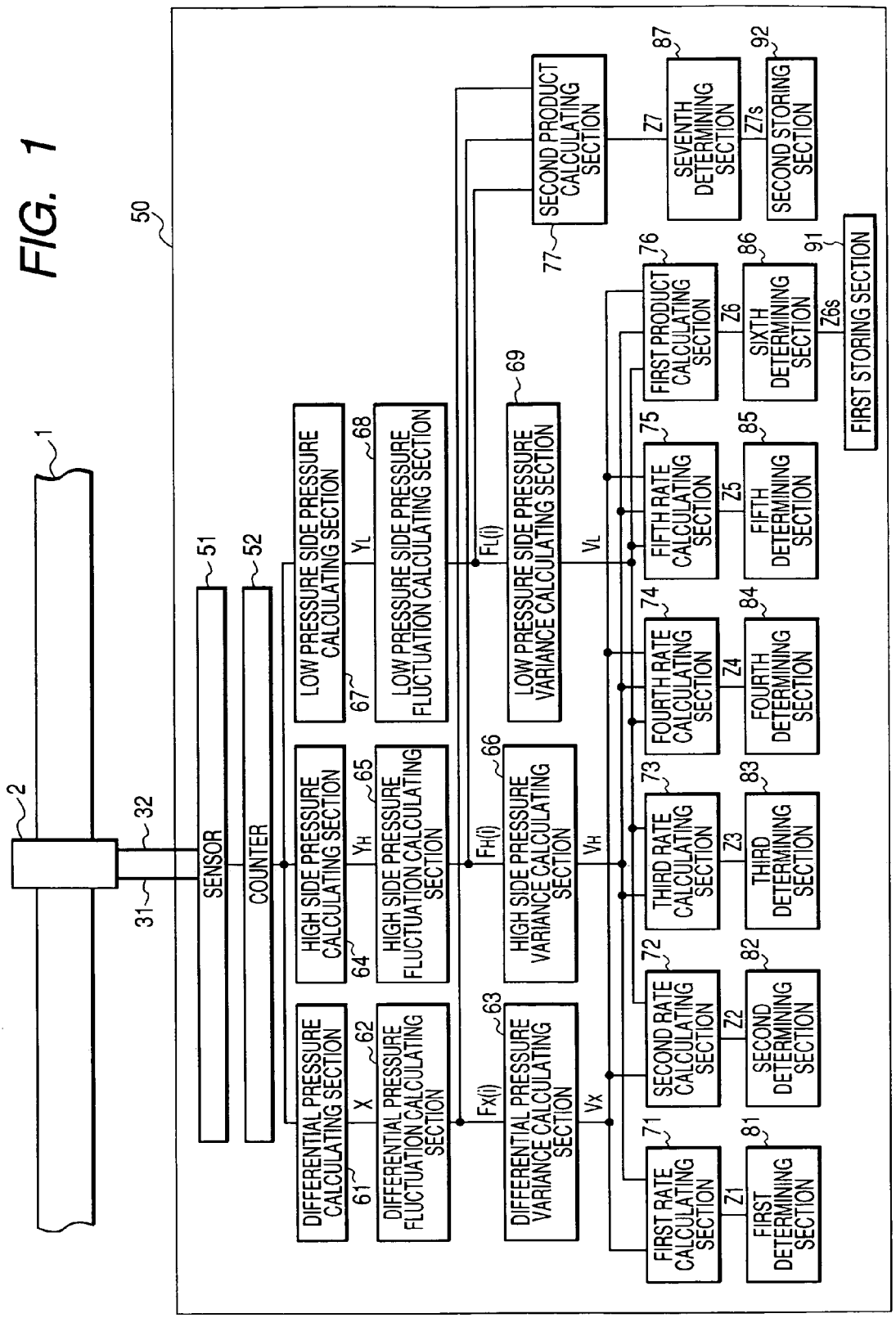
FIG. 1 is a configuration diagram showing an embodiment of the invention.

The invention will be explained in details in reference to FIG. 1 as follows. FIG. 1 is a configuration diagram showing an embodiment of the invention. A characteristic of the embodiment of FIG. 1 is included in a configuration with regard to a first rate calculating section 71, a configuration with regard to a second rate calculating section 72, a configuration with regard to a third rate calculating section 73, a configuration with regard to a fourth rate calculating section 74, a configuration with regard to a fifth rate calculating section 75, a configuration with regard to a first product calculating section 76, a configuration with regard to a second product calculating section 77 respectively.

An orifice 2 is installed at a middle of a pipe line 1 in which a fluid flows. A pressure on a high pressure side of the orifice 2 is transmitted to a sensor 51 inside of a differential pressure transmitter (pressure transmitter, pressure detector) 50 by a high pressure side impulse line 31, and a pressure on a low pressure side of the orifice 2 is transmitted to the sensor 51 by a low pressure side impulse line 32.

Further, the sensor 51 is formed by, for example, an oscillating-type-sensor for detecting the pressure from the high pressure side impulse line 31 and the pressure from the low pressure side impulse line 32. In details, the sensor 51 is provided with two oscillating-type-sensors formed on the same element. Further, one of the oscillating-type-sensors is formed at a center portion of a diaphragm (not illustrated) of the pressure sensor and other of the oscillating-type-sensors is formed at a peripheral portion of the diaphragm. Further, a frequency $F_c$ of one output to the sensor 51 and a frequency $F_r$ of other output thereof are respectively changed based on the pressure from the high pressure side impulse line 31 and the pressure from the low pressure side impulse line 32.

Further, a counter 52 is connected to the outputs of the sensor 51 for respectively counting the frequency $F_c$ of the one output and the frequency $F_r$ of the other output.

Further, a differential pressure calculating section 61 is connected to an output of the counter 52. Further, the differential pressure calculating section 61 calculates a differential pressure signal X by executing calculation of Equation (1) shown below.

$$X=(F_c/F_{co})^2-1-A_D\cdot\{(F_r/F_{ro})^2-1\} \quad (1)$$

Incidentally, the frequency $F_c$ is a frequency of one output of the sensor 51, a frequency $F_{co}$ is a frequency of one output of the sensor 51 in a state of a reference pressure, a frequency $F_r$ is a frequency of other output of the sensor 51, a frequency $F_{ro}$ is other output of the sensor 51 in a state of a reference pressure.

Here, for example, the state of the reference pressure is a case in which the pressures on the high pressure side and the low pressure side are an atmospheric pressure, and the frequency $F_{co}$ and the frequency $F_{ro}$ are previously stored in a memory or the like (not illustrated).

Further, a constant $A_D$ of Equation (1) is a constant of a predetermined calculating equation determined such that the differential pressure signal X is not influenced by a change in the high side pressure and a change in the low side pressure. In details, for example, both of the high side pressure and the low side pressure are changed from 0 kPa to 50 kPa. At this occasion, when assuming the constant $A_D$ is a predetermined value, the differential pressure signal X becomes a constant value.

That is, the value of the differential pressure signal X has a characteristic that it is difficult to be influenced by changes in static pressure signals Y of the high side pressure and the low side pressure.

Here, the differential pressure signal X generated at i th time is designated as a pressure differential signal X(i) and the differential pressure signal X generated at (i-1) th time is designated as a differential pressure signal X(i-1). Further, notation N designates a number of all samples.

Further, a differential pressure fluctuation calculating section 62 is connected to an output of the differential pressure calculating section 61. Further, the differential pressure fluctuation calculating section 62 calculates a differential pressure fluctuation $F_X(i)$ by executing calculation of Equation (2) shown below. That is, the fluctuation is defined by a difference.

$$F_X(i)=X(i)-X(i-1) \quad (2)$$

Further, a differential pressure variance calculating section 63 is connected to an output of the differential pressure fluctuation calculating section 62. Further, the differential pressure variance calculating section 63 calculates a differential pressure variance $V_X$ by executing calculation of Equation (3) shown below. That is, the variance is defined by a mean square.

$$V_X=\Sigma(F_X(i)^2)/N \quad (3)$$

Similarly, a high side pressure calculating section 64 is connected to the output of the counter 52. Further, the high side pressure calculating section 64 calculates a high side pressure signal $Y_H$ by executing calculation of Equation (4) shown below.

$$Y_H=(F_c/F_{co})^2-1+A_H\cdot\{(F_r/F_{ro})^2-1\} \quad (4)$$

Further, a constant $A_H$ of Equation (4) is a predetermined value by which the pressure from the high pressure side connecting tube 31 becomes constant, and further, a value of the high side pressure signal $Y_H$ becomes substantially constant relative to a change of only the pressure from the low pressure side impulse line 32.

In details, for example, the pressure from the high pressure side impulse line 31 is assumed to be constant at 100 kPa and the pressure from the low pressure side impulse line 32 is changed from 0 kPa to 50 kPa. At this occasion, when the constant $A_H$ is adjusted to the predetermined value, the value of the high side pressure signal $Y_H$ becomes the constant value at 100 kPa.

That is, a value of the high side pressure signal $Y_H$ has a characteristic that it is difficult to be influenced by the change of the pressure from the low pressure side impulse line 32. Further, the value of the high side pressure signal $Y_H$ becomes a value based on the pressure from the high pressure side impulse line 31. Further, the high side pressure signal YH corresponds to a first static pressure signal.

Further, the pressure side pressure signal $Y_H$ generated at i th time is designated as a high side pressure signal $Y_H(i)$ and the high side pressure signal $Y_H$ generated at (i-1) th time is designated as a high side pressure side signal $Y_H(i-1)$. Further, notation N designates a number of all samples.

Further, a high side pressure fluctuation calculating section 65 is connected to an output of the high side pressure calculating section 64. Further, the high side pressure fluctuation calculating section 65 calculates a high side pressure fluctuation $F_H(i)$ by executing calculation of Equation (5) shown below. That is, the fluctuation is defined by a difference.

$$F_H(i) = Y_H(i) - Y_H(i-1) \qquad (5)$$

Further, a high side pressure variance calculating section 66 is connected to an output of the high side pressure fluctuation calculating section 65. Further, the high side pressure variance calculating section 66 calculates a high side pressure variance $V_H$ by executing calculation of Equation (6) shown below. That is, the variance is defined by a mean square.

$$V_H = \Sigma(F_H(i)^2)/N \qquad (6)$$

Similarly, a low side pressure calculating section 67 is connected to the output of the counter 52. Further, the low side pressure calculating section 67 calculates a low side pressure signal $Y_L$ by executing calculation of Equation (7) shown below.

$$Y_L = (F_c/F_{co})^2 - 1 + A_L \cdot (F_r/F_{ro})^2 - 1) \qquad (7)$$

Further, a constant $A_L$ of Equation (7) is a predetermined value by which the pressure from the low pressure side impulse line 32 becomes constant, and further, a value of the low side pressure signal $Y_L$ becomes substantially constant relative to a change in only the pressure from the high pressure side impulse line 31.

In details, for example, the pressure from the low pressure side impulse line 32 is assumed be constant at 100 kPa and the pressure from the high pressure side impulse line 31 is made to change from 0 kPa to 50 kPa. At this occasion, when the constant $A_L$ is adjusted to the predetermined value, the value of the low side pressure signal $Y_L$ becomes constant at 100 kPa.

That is, the value of the low side pressure signal $Y_L$ has a characteristic that it is difficult to be influenced by a change in the pressure from the high pressure side impulse line 31. Further, the value of the low side pressure signal $Y_L$ becomes a value based on the pressure from the low pressure side impulse line 32. Further, the low side pressure signal $Y_L$ corresponds to a second static pressure signal.

Here, the low side pressure signal $Y_L$ generated at i th time is designated as a low side pressure side signal $Y_L(i)$, and a low side pressure signal $Y_L$ generated at (i-1) th time is designated as a low side pressure signal $Y_L(i-1)$. Further, notation N designates a number of all samples.

Further, a low side pressure fluctuation calculating section 68 is connected to an output of the low side pressure calculating section 67. Further, the low side pressure fluctuation calculating section 68 calculates a low side pressure fluctuation $F_L(i)$ by executing calculation of Equation (8) shown below. That is, the fluctuation is defined by a difference.

$$F_L(i) = Y_L(i) - Y_L(i-1) \qquad (8)$$

Further, a low side pressure variance calculating section 69 is connected to an output of the low side pressure fluctuation calculating section 68. Further, the low side pressure variance calculating section 69 calculates a low side pressure variance $V_L$ by executing calculation of Equation (9) shown below. That is, the variance is defined by a mean square.

$$V_L = \Sigma(F_L(i)^2)/N \qquad (9)$$

Further, a first rate calculating section 71 is connected to an output of the differential pressure variance calculating section 63 and an output of the high side pressure variance calculating section 66. Further, the first rate calculating section 71 calculates a diagnosis variable Z1 by executing calculation of Equation (10) shown below. That is, the diagnosis variable Z1 is defined by a ratio of the high side pressure variance $V_H$ to the differential pressure variance $V_X$.

$$Z1 = V_H/V_X \qquad (10)$$

Further, a first determining section 81 is connected to an output of the first rate calculating section 71. Further, the first determining section 81 determines blockage of the high pressure side impulse line 31 or blockage of the low pressure side impulse line 32 based on a value of the diagnosis variable Z1. That is, blockage of the high pressure side impulse line 31 or the low pressure side impulse line 32 is determined by comparing the value of the diagnosis variable Z1 and a predetermined value.

Further, the second rate calculating section 72 is connected to the output of the differential pressure variance calculating section 63 and an output of the low side pressure variance calculating section 69. Further, the second rate calculating section 72 calculates a diagnosis variable Z2 by executing calculation of Equation (11) shown below. That is, the diagnosis variable Z2 is defined by a ratio of the low side pressure variance $V_L$ to the differential pressure variance $V_X$.

$$Z2 = V_L/V_X \qquad (11)$$

Further, a second determining section 82 is connected to an output of the second rate calculating section 72. Further, the second determining section 82 determines blockage of the high pressure side impulse line 31 or blockage of the low pressure side impulse line 32 based on a value of the diagnosis variable Z2. In details, blockage of the high pressure side impulse line 31 or the low pressure side impulse line 32 is determined by comparing the value of the diagnosis variable Z2 and a predetermined value.

Further, a third rate calculating section 73 is connected to the output of the high side pressure variance calculating section 66 and the output of the low side pressure variance calculating section 69. Further, the third rate calculating section 73 calculates a diagnosis variable Z3 by executing calculation of Equation (12) shown below. That is, the diagnosis variable Z3 is defined by a ratio of the high side pressure variance $V_H$ to the low side pressure variance $V_L$.

$$Z3 = V_H / V_L \tag{12}$$

Further, a third determining section 83 is connected to an output of the third rate calculating section 73. Further, the third determining section 83 determines blockage of the high pressure side impulse line 31 or blockage of the pressure side impulse line 32 based on a value of the diagnosis variable Z3. In details, blockage of the high pressure side impulse line 31 or the low pressure side impulse line 32 is determined by comparing a value of the diagnosis variable Z3 and a predetermined value.

Further, a fourth rate calculating section 74 is connected to the output of the differential variance calculating section 63, the output of the high side pressure variance calculating section 66 and the output of the low side pressure variance calculating section 69. Further, the fourth rate calculating section 74 calculates a diagnosis variable Z4 by executing calculation of Equation (13) shown below. That is, the diagnosis variable Z4 is defined by a ratio of the high side pressure variance ($V_H$) to a sum of the low side pressure variance ($V_L$) and the differential pressure variance ($V_X$).

$$Z4 = V_H / (V_L + V_X) \tag{13}$$

That is, the diagnosis variable Z4 is a variable according to the ratio of the high side pressure variance $V_H$ to the differential pressure variance $V_X$ when the low side pressure variance $V_L$ is negligible, and is a variable according to the ratio of the high side pressure variance $V_H$ to the low side pressure variance $V_L$ when the differential pressure variance $V_X$ is negligible.

Further, a sensitivity of the diagnosis variable Z4 in diagnosing blockage of the low pressure side impulse line 32 is higher than that of the diagnosis variable Z1, and is suitable to diagnosis of only blockage of the low pressure side impulse line 32. Further, a representative value of the diagnosis variable Z4 becomes about 0.33 when the high pressure side impulse line 31 is not blocked and the low pressure side impulse line 32 is not blocked, and becomes about 1.0 when the high pressure side impulse line 31 is not blocked and only the low pressure side impulse line 32 is blocked.

Further, a fourth determining section 84 is connected to an output of the fourth rate calculating section 74. Further, the fourth determining section 84 determines blockage of the high pressure side impulse line 31 or blockage of the low pressure side impulse line 32 based on a value of the diagnosis variable Z4. In details, blockage of the high pressure side impulse line 31 or the low pressure side impulse line 32 is determined by comparing a value of the diagnosis variable Z4 and a predetermined value.

Further, the fifth rate calculating section 75 is connected to the output of the differential pressure variance calculating section 63, the output of the high side pressure variance calculating section 66 and the output of the low side pressure variance calculating section 69. Further, the fifth rate calculating section 75 calculates a diagnosis variable Z5 by executing calculation of Equation (14) shown below. That is, the diagnosis variable Z5 is defined by a ratio of the low side pressure variance ($V_L$) to a sum of the high side pressure variance ($V_H$) and the differential pressure variance ($V_X$).

$$Z5 = V_L / (V_H + V_X) \tag{14}$$

That is, the diagnosis variable Z5 is a variable according to the ratio of the low side pressure variance $V_L$ to the differential pressure variance $V_X$ when the high side pressure variance $V_H$ is negligible, and is a variable according to the ratio of the high side pressure variance $V_H$ to the low side pressure variance $V_L$ when the differential pressure variance $V_X$ is negligible.

Further, a sensitivity of the variance variable Z5 in diagnosing blockage of the high pressure side impulse line 31 is higher than that of the diagnosis variable Z2, and is suitable for diagnosing only blockage of the high pressure side impulse line 31. Further, a representative value of the diagnosis variable Z5 becomes about 0.33 when the high pressure side impulse line 31 is not blocked and the low pressure side impulse line 32 is not blocked, and becomes about 1.0 when only the high pressure side impulse line 31 is blocked and the low pressure side impulse line 32 is not blocked.

Further, a fifth determining section 85 is connected to an output of the fifth rate calculating section 75. Further, the fifth determining section 85 determines blockage of the high pressure side impulse line 31 or blockage of the low pressure side impulse line 32 based on a value of the diagnosis variable Z5. In details, blockage of the high pressure side impulse line 31 or the low pressure side impulse line 32 is determined by comparing the value of the diagnosis variable Z5 and a predetermined value.

Further, the first product calculating section 76 is connected to an output of the differential pressure variance calculating section 63, the output of the high side pressure variance calculating section 66 and the output of the low side pressure variance calculating section 69. Further, the first product calculating section 76 calculates a first variable Z6 of a product by executing calculation of Equation (15) shown below. That is, the first variable Z6 is defined by a product of the differential pressure variance $V_X$, the high side pressure variance $V_H$ and the low side pressure variance $V_L$.

$$Z6 = V_X \cdot V_H \cdot V_L \tag{15}$$

Further, a sixth determining section 86 is connected to an output of the first product calculating section 76. Further, the sixth determining section 86 determines blockage of both the high pressure side impulse line 31 and the low pressure side impulse line 32 based on a value of the first variable Z6. In details, blockage of both of the high pressure side impulse line 31 and the low pressure side impulse line 32 is determined by comparing the value of the first variable Z6 and a predetermined value.

Further, a first storing section 91 stores a value Z6s of the first variable Z6 when blockage is not occurred. In details, the value Z6s when blockage is not occurred, which is immediately after maintenance, is stored in and held by the first storing section 91 as a reference value.

Further, the sixth determining section 86 calculates a diagnosis variable (Z6/Z6s) of a ratio of the first variable Z6 to the value (Z6s) previously stored in the first storing section 91. Furthermore, the sixth determining section 86 determines blockage of both the high pressure side impulse line 31 and the low pressure side impulse line 32 based on a value of the diagnosis variable (Z6/Z6s). In details, blockage of both the high pressure side impulse line 31 and the low pressure side impulse line 32 is determined by comparing a value of the diagnosis variable (Z6/Z6s) and a predetermined value.

Further, a second product calculating section 77 is connected to the output of the differential pressure fluctuation calculating section 62, the output of the high side pressure fluctuation calculating section 65 and the output of the low side pressure fluctuation calculating section 68. Further, the second product calculating section 77 calculates a second variable Z7 of a product by executing calculation of Equation (16) shown below. That is, the second variable Z7 is defined by a variable according to a product of the differential pressure fluctuation ($F_X(i)$) the high side pressure fluctuation ($F_H(i)$) and the low side pressure fluctuation ($F_L(i)$).

$$Z7=\Sigma(F_X(i) \cdot F_H(i) \cdot F_L(i))^2/N \qquad (16)$$

Further, a seventh determining section 87 is connected to an output of the second product calculating section 77. Further, the seventh determining section 87 determines blockage of both the high pressure side impulse line 31 and the low pressure side impulse line 32 based on a value of the second variable Z7. In details, blockage of both the high pressure side impulse line 31 and the low pressure side impulse line 32 is determined by comparing the value of the second variable Z7 and a predetermined value.

Further, a second storing section 92 stores a value Z7s of the second variable Z7 when blockage is not occurred. In details, the value Z7s when blockage is not occurred, which is immediately after maintenance, is stored in and held by the second storing section 92 as a reference value.

Further, the seventh determining section 87 calculates a diagnosis variable (Z7/Z7s) of a ratio of the second variable Z7 to the value (Z7s) previously stored in the second storing section 92. Furthermore, the seventh determining section 87 determines blockage of both the high pressure side impulse line 31 and the low pressure side impulse line 32 based on a value of the diagnosis variable (Z7/Z7s). In details, blockage of both the high pressure side impulse line 31 and the low pressure side impulse line 32 is determined by comparing the value of the diagnosis variable (Z7/Z7s) and a predetermined value.

Figure 2:
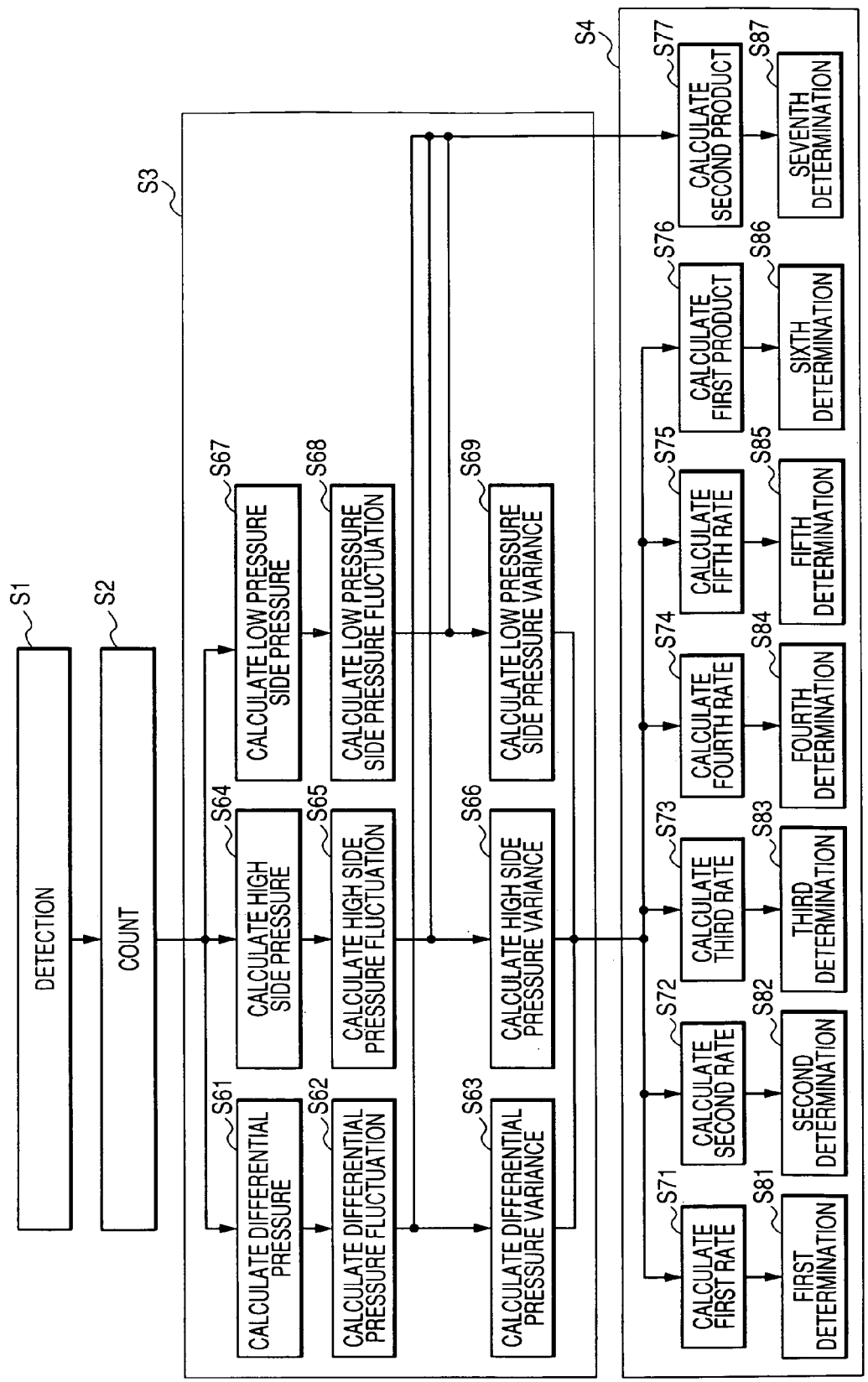
FIG. 2 is a flow chart showing a diagnosing method of an embodiment of the invention.

An explanation will be given of a method of diagnosing blockage according to the embodiment of FIG. 1 as follows in reference to FIG. 2 successively at respective steps. FIG. 2 is a flowchart showing a diagnosing method of an embodiment of the invention. Further, there are a case in which the flowchart of FIG. 2 is processed by one microprocessor and a case in which the flowchart is processed in parallel by a plurality of microprocessors. In either of the cases, a substantially equivalent configuration is constructed and equivalent operation and effect are achieved.

First, step S1 of detecting the high side pressure and the low side pressure is executed at the sensor 51.

Second, counting step S2 of respectively counting the frequency $F_c$ of one output and the frequency $F_r$ of other output is executed at the counter 52.

Third, step S3 of calculating pressure fluctuation and variance is executed at the differential pressure calculating section 61, the differential pressure fluctuation calculating section 62, the differential pressure variance calculating section 63, the high pressure side output calculating section 64, the high side pressure fluctuation calculating section 65, the high side pressure variance calculating section 66, the low side pressure calculating section 67, the low side pressure fluctuation calculating section 68 and the low side pressure variance calculating section 69.

In details, at step S61 of calculating the differential pressure, the differential pressure signal X based on the differential pressure of the high side pressure and the low side pressure is calculated, at step S62 of calculating the differential pressure fluctuation, the differential pressure fluctuation $F_X(i)$ is calculated from the differential pressure signal X, and at step S63 of calculating the differential pressure variance, the differential pressure variance $V_X$ is calculated from the differential pressure fluctuation $F_X(i)$.

Further, at step S64 of calculating the high side pressure, the high side pressure signal $Y_H$ based on the pressure from the high side pressure impulse line 31 is calculated, at step S65 of calculating the high side pressure fluctuation, the high side pressure fluctuation $F_H(i)$ is calculated from the high side pressure signal $Y_H$, and at step S66 of calculating the high side pressure variance, the high side pressure variance $V_H$ is calculated from the high side pressure fluctuation $F_H(i)$.

Further, at step S67 of calculating the low side pressure, the low side pressure signal $Y_L$ based on the pressure from the low side pressure impulse line 32 is calculated, at step S68 of calculating the low side pressure fluctuation, the low side pressure fluctuation $F_L(i)$ is calculated from the low side pressure signal $Y_L$, and at step S69 of calculating the low side pressure variance, the low side pressure variance $V_L$ is calculated from the low side pressure fluctuation $F_L(i)$.

Fourth, step S4 of calculating the rate, calculating the product and determination is executed at the first rate calculating section 71, the second rate calculating section 72, a third rate calculating section 73, the fourth rate calculating section 74, the fifth rate calculating section 75, the first product calculating section 76, the second product calculating section 77, the first determining section 81, the second determining section 82, the third determining section 83, the fourth determining section 84, the fifth determining section 85, the sixth determining section 86 and the seventh determining section 87.

In details, at step S71 of calculating the first rate, the first diagnosis variable Z1 is calculated from the high side pressure variance $V_H$ and the differential pressure variance, and at first determining step S81, blockage of the high pressure side impulse line 31 or blockage of the low pressure side impulse line 32 is determined based on the first diagnosis variable Z1.

Further, at step S72 of calculating the second rate, the second diagnosis variable Z2 is calculated from the low side pressure variance $V_L$ and the differential pressure variance $V_X$, and at second determining step S82, blockage of the high pressure side impulse line 31 or blockage of the low pressure side impulse line 32 is determined based on the value of the second diagnosis variable Z2.

Further, at step S73 of calculating the third rate, the third diagnosis variable Z3 is calculated from the high side pressure variance $V_H$ and the low side pressure variance $V_L$, and at third determining step S83, blockage of the high pressure impulse line 31 or blockage of the low pressure side impulse line 32 is determined based on the value of the third diagnosis variable Z3.

Further, at step S74 of calculating the fourth rate, the fourth diagnosis variable Z4 is calculated from the high side pressure variance $V_H$, the low side pressure variance $V_L$ and the differential pressure variance $V_X$, and at fourth determining step S84, blockage of the high pressure impulse line 31 or blockage of the low pressure side impulse line 32 is determined based on the value of the fourth diagnosis variable Z4.

Further, at step S75 of calculating the fifth rate, the fifth diagnosis variable Z5 is calculated from the high side pressure variance $V_H$, the low side pressure variance $V_L$ and the differential pressure variance $V_X$, and at fifth determining step S85, blockage of the high pressure impulse line 31 or blockage of the low pressure side impulse line 32 is determined based on the value of the fifth diagnosis variable Z5.

Further, at step S76 of calculating the first product, the first variable Z6 is calculated from the differential pressure variance $V_X$, the high side pressure variance $V_H$ and the low side pressure variance $V_L$, and at sixth determining step S86, blockage of both the high pressure side impulse line 31 and the low pressure side impulse line 32 is determined based on the value of the first variable Z6.

Further, at step S77 of calculating the second product, the second variable Z7 is calculated from the differential pressure fluctuation ($F_X(i)$), the high side pressure fluctuation ($F_H(i)$) and the low side pressure fluctuation ($F_L(i)$), and at seventh determining step S87, blockage of both the high pressure side impulse line 31 and the low pressure impulse line 32 is determined based on the value of the second variable Z7.

Figure 3:
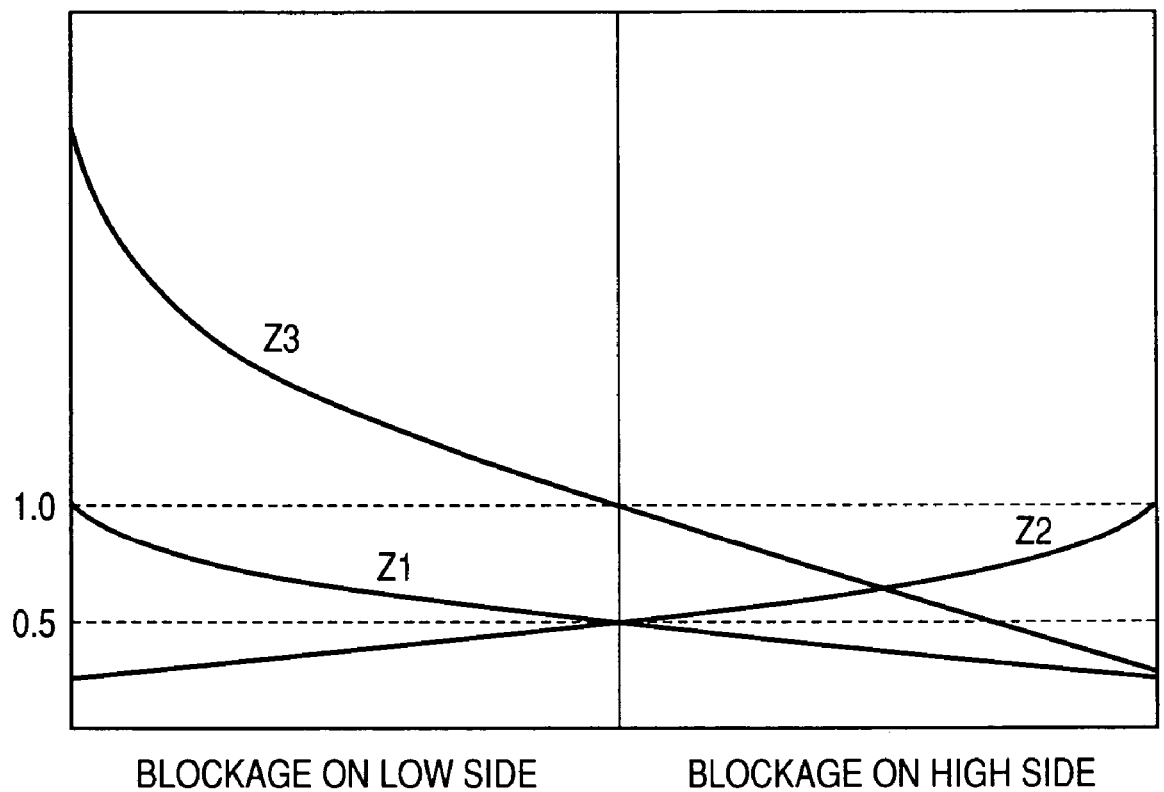
FIG. 3 is a characteristic diagram showing characteristics of a diagnosis variable Z1, a diagnosis variable Z2 and a diagnosis variable Z3 of an embodiment of FIG. 1.

A detailed explanation will be given of characteristics of the diagnosis variable Z1, the diagnosis variable 22 and the diagnosis variable Z3 in the first rate calculating section 71, the second rate calculating section 72 and the third rate calculating section 73 of the embodiment of FIG. 1 in reference to FIG. 3 as follows. FIG. 3 is a characteristic diagram showing characteristics of the diagnosis variable Z1, the diagnosis variable Z2 and the diagnosis variable Z3 of the embodiment of FIG. 1.

In the drawing, the abscissa designates a degree of blockage of the high pressure side impulse line 31 (blockage on HIGH side) and a degree of blockage of the low pressure side impulse line 32 (blockage on LOW side). In details, the degree of blockage of the high pressure side impulse line 31 is increased from a left side of FIG. 3 in a direction of a right side. Further, conversely, a degree of blockage of the low pressure side impulse line 32 is increased from a right side of FIG. 3 in a direction of a left side. Further, in the drawing, the ordinate designates values of the diagnosis variable Z1, the diagnosis variable Z2 and the diagnosis variable Z3. Further, the values of the diagnosis variable Z1, the diagnosis variable Z2 and the diagnosis variable Z3 are distributed respectively in pertinent ranges.

That is, first, in the characteristic diagram of FIG. 3, a center portion shows a representative state when the high pressure side impulse line 31 is not blocked and the low pressure impulse line 32 is not blocked. At this occasion, a representative value of the diagnosis variable Z1 becomes about 0.5, a representative value of the diagnosis variable Z2 becomes about 0.5 and a representative value of the diagnosis variable Z3 becomes about 1.0.

Second, in the characteristic diagram of FIG. 3, a right side end portion thereof shows a representative state when the high pressure side impulse line 31 is blocked and the low pressure side impulse line 32 is not blocked. At this occasion, the representative value of the diagnosis variable Z2 becomes about 1.0, and the diagnosis variable Z1 and the diagnosis variable Z3 becomes small.

Third, in the characteristic diagram of FIG. 3, a left side end portion thereof shows a representative state when the high pressure side impulse line 31 is not blocked and only the low pressure side impulse line 32 is blocked. At this occasion, the representative value of the diagnosis variable Z1 becomes about 1.0, the diagnosis variable Z2 becomes small, and the diagnosis variable Z3 becomes large.

Fourth, although there is also a case in which a case of blockage of both the high pressure side impulse line 31 and the low pressure impulse line 32 is disposed at the center of FIG. 3, there is no inevitability therein.

Further, the values of the diagnosis variable Z1, the diagnosis variable Z2, and the diagnosis variable Z3 are provided with characteristics of monotonously changing relative to the degree of blockage of the high pressure side impulse line 31 and the degree of blockage of the low pressure side impulse line 32 (abscissa). Therefore, blockage can simply be determined by comparing the value of the diagnosis variable Z1 and the predetermined value, blockage can simply be determined by simply comparing the value of the diagnosis variable Z2 and the predetermined value, blockage can simply be determined by comparing the value of the diagnosis variable Z3 and the predetermined value.

Operation of the embodiment of FIG. 1 constituted as described above will be explained in reference to FIG. 1 through FIG. 4. FIG. 4 is a table of determining diagnosis of blockage according to the embodiment of FIG. 1, showing a threshold of practical determination.

First, an explanation will be given of a case in which the flow rate in the pipe line 1 is brought into a steady state.

First, an explanation will be given of a case in which the high pressure side impulse line 31 is not blocked and the low pressure side impulse line 32 is not blocked. At this occasion, a value of the differential pressure fluctuation $F_X(i)$ becomes large and a value of the differential pressure variance $V_X$ becomes large, a value of the high side pressure fluctuation $F_H(i)$ becomes large and a value of the high side pressure variance $V_H$ becomes large, a value of the low side pressure fluctuation $F_L(i)$ becomes large and a value of the low side pressure variance $V_L$ becomes large.

Therefore, the value of the diagnosis variable Z1 is distributed to predetermined values, the value of the diagnosis variable Z2 is distributed to predetermined values, the value of the diagnosis variable Z3 is distributed to predetermined values, and the value of the diagnosis variable (Z6/Z6s) is distributed to predetermined values. Specifically, the value of the diagnosis variable Z1 becomes substantially any value of from 0.25 to 0.9, the value of the diagnosis variable Z2 becomes any value of from 0.25 to 0.9, the value of the diagnosis variable Z3 becomes any value of from 0.25 to 1.75, the value of the diagnosis variable Z4 becomes any value of from 0.25 to 0.9, the value of the diagnosis variable Z5 becomes any value of from 0.25 to 0.9, the value of the diagnosis variable (Z6/Z6s) becomes a value larger than 0.015, and the value of the diagnosis variable (Z7/Z7s) becomes a value larger than 0.015.

Further, when all of the value of the diagnosis variable Z1, the value of the diagnosis variable Z2, the value of the diagnosis variable Z3, the value of the diagnosis variable Z4, the value of the diagnosis variable Z5, the value of the diagnosis variable (Z6/Z6s) and the value of the diagnosis variable (Z7/Z7s) fall in the ranges, the embodiment of FIG. 1 is determined to be normal.

Second, an explanation will be given of a case in which only the high pressure side impulse line 31 is blocked and the low pressure side impulse line 32 is not blocked. At this occasion, the value of the differential pressure fluctuation $F_X(i)$ is large and the value of differential pressure variance $V_X$ is large. Further, by blockage, the value of the high side pressure fluctuation $F_H(i)$ becomes small, and the value of the high side pressure variance $V_H$ becomes small. Further, the value of the low side pressure fluctuation $F_L(i)$ is large, and the value of the low side pressure variance $V_L$ is large.

Therefore, the value of the diagnosis variable Z1 becomes small, the value of the diagnosis variable Z2 is distributed to predetermined values, the value of Z3 becomes small, the value of the diagnosis variable Z4 becomes small, the value of the diagnosis variable Z5 is distributed to predetermined values. Specifically, the value of the diagnosis variable Z1 becomes substantially any value of from 0 to 0.25, the value of the diagnosis variable Z2 becomes any value of from 0.9 to 1.1, the value of the diagnosis variable Z3 becomes any value of from 0 to 0.25, the value of the diagnosis variable Z4 becomes any value of from 0 to 0.25, and the value of the diagnosis variable Z5 becomes any value of from 0.9 to 1.1.

Further, when any of the value of the diagnosis variable Z1, the value of the diagnosis variable Z2, the value of the diagnosis variable Z3, the value of the diagnosis variable Z4 or the value of the diagnosis variable Z5 falls in the range, in the embodiment of FIG. 1, it is determined that only the high pressure side impulse line 31 is blocked and the low pressure side impulse line 32 is not blocked. Further, the configuration according to the diagnosis variable Z1, the configuration according to the diagnosis variable Z2, the configuration according to the diagnosis variable Z3, the configuration according to the diagnosis variable Z4 and the configuration according to the diagnosis variable Z5 are redundant.

Third, an explanation will be given of a case in which the high pressure side impulse line 31 is not blocked and the low pressure impulse line 32 is blocked. At this occasion, the value of the differential pressure fluctuation $F_X(i)$ is large and the value of the differential pressure variance $V_X$ is large. Further, the value of the high side pressure fluctuation $F_H(i)$ is large, and the value of the high side pressure variance $V_H$ is large. Further, by blockage, the value of the low pressure side fluctuation $F_L(i)$ becomes small, and the value of the low side pressure variance $V_L$ becomes small.

Therefore, the value of the diagnosis variable Z1 is distributed to predetermined values, the value of the diagnosis variable Z2 becomes small, the value of the diagnosis variable Z3 becomes large, the value of the diagnosis variable Z4 is distributed to predetermined values, and the value of the diagnosis variable Z5 becomes small. Specifically, the value of the diagnosis variable Z1 becomes substantially any value of from 0.9 to 1.1, the value of the diagnosis variable Z2 becomes any value of from 0 to 0.25, the value of the diagnosis variable Z3 becomes a value larger than 1.75, the value of the diagnosis variable Z4 becomes any value of from 0.9 to 1.1, and the value of the diagnosis variable Z5 becomes any value of from 0 to 0.25.

Further, when any of the value of the diagnosis variable Z1, the value of the diagnosis variable Z2, the value of the diagnosis variable Z3, the value of the diagnosis variable Z4 or the value of the diagnosis variable Z5 falls in the range, in the embodiment of FIG. 1, it is determined that the high pressure impulse line 31 is not blocked and only the low pressure side impulse line 32 is blocked. Further, the configuration according to the diagnosis variable Z1, the configuration according to the diagnosis variable Z2, the configuration according to the diagnosis variable Z3, the configuration according to the diagnosis variable Z4 and the configuration according to the diagnosis variable Z5 are redundant.

Fourth, an explanation will be given of a case in which both of the high pressure side impulse line 31 and the low pressure side impulse line 32 are blocked. At this occasion, by blockage, the value of the differential pressure fluctuation $F_X(i)$ becomes small and the value of the differential pressure variance $V_X$ becomes small, the value of the high side pressure fluctuation $F_H(i)$ becomes small and the value of the high side pressure variance $V_H$ becomes small, the value of the low side pressure fluctuation $F_L(i)$ becomes small and the value of the low side pressure variance $V_L$ becomes small.

Therefore, the value of the diagnosis variable (Z6/Z6s) becomes small, the value of the diagnosis variable (Z7/Z7s) becomes small. Specifically, the value of the diagnosis variable (Z6/Z6s) becomes substantially any value of from 0 to 0.15, the value of the diagnosis variable (Z7/Z7s) becomes substantially any value of from 0 to 0.015.

Further, when the value of the diagnosis variable (Z6/Z6s) or the value of the diagnosis variable (Z7/Z7s) falls in the range, in the embodiment of FIG. 1, it is determined that the high pressure impulse line 31 is blocked and the low pressure side impulse line 32 is blocked. That is, it is determined that both the high pressure side impulse line 31 and the low pressure side impulse line 32 are blocked. Further, the configuration according to the diagnosis variable (Z6/Z6s) and the configuration according to the diagnosis variable (Z7/Z7s) are redundant.

Therefore, in the first determining section 81, when the diagnosis variable Z1 is smaller than 0.25, there is brought about a result of determination that only the high pressure side impulse line 31 is blocked and the low pressure side impulse line 32 is not blocked. Further, when the diagnosis variable Z1 is larger than 0.9, there is brought about a result of determination that the high pressure side impulse line 31 is not blocked and only the low pressure side impulse line 32 is blocked.

Further, in the second determining section 82, when the diagnosis variable Z2 is larger than 0.9, there is brought about a result of determination that only the high pressure side impulse line 31 is blocked and the low pressure side impulse line 32 is not blocked. Further, when the diagnosis variable Z2 is smaller than 0.25, there is brought about a result of determination that the high pressure side impulse line 31 is not blocked and only the low pressure side impulse line 32 is blocked.

Further, in the third determining section 83, when the diagnosis variable Z3 is smaller than 0.25, there is brought about a result of determination that only the high pressure side impulse line 31 is blocked and the low pressure side impulse line 32 is not blocked. Further, when the diagnosis variable Z3 is larger than 1.75, there is brought about a result of determination that the high pressure side impulse line 31 is not blocked and only the low pressure side impulse line 32 is blocked.

Further, in the fourth determining section 84, when the diagnosis variable Z4 is smaller than 0.25, there is brought about a result of determination that only the high pressure side impulse line 31 is blocked and the low pressure side impulse line 32 is not blocked. Further, when the diagnosis variable Z4 is larger than 0.9, there is brought about a result of determination that the high pressure side impulse line 31 is not blocked and only the low pressure side impulse line 32 is blocked.

Further, in the fifth determining section 85, when the diagnosis variable Z5 is larger than 0.9, there is brought about a result of determination that only the high pressure side impulse line 31 is blocked and the low pressure side impulse line 32 is not blocked. Further, when the diagnosis variable Z5 is smaller than 0.25, there is brought about a result of determination that the high pressure side impulse line 31 is not blocked and only the low pressure side impulse line 32 is blocked.

Further, in the sixth determining section 86, when the diagnosis variable (Z6/Z6s) is smaller than 0.015, there is brought about a result of determination that both of the high pressure side impulse line 31 and the low pressure side impulse line 32 are blocked.

Further, in the seventh determining section 87, when the diagnosis variable (Z7/Z7s) is smaller than 0.015, there is brought about a result of determination that both of the high pressure side impulse line 31 and the low pressure side impulse line 32 are blocked.

Next, an explanation will be given of a case in which the flow rate in the pipe line 1 is changed.

When the flow rate becomes small, the value of the high side pressure fluctuation $F_H(i)$ becomes small, and the value of the high side pressure variance $V_H$ becomes small. Further, also the value of the low side pressure fluctuation $F_L(i)$ becomes small, and the value of the low side pressure variance $V_L$ becomes small.

Therefore, even when the flow rate becomes small, the value of the diagnosis variable Z1, the value of the diagnosis variable Z2, the value of the diagnosis variable Z3, the value of the diagnosis variable Z4 and the value of the diagnosis variable Z5 are hardly varied respectively.

Similarly, when the flow rate becomes large, the value of the high side pressure fluctuation $F_H(i)$ becomes large, and the value of the high side pressure variance $V_H$ becomes large. Further, also the value of the low side pressure fluctuation $F_L(i)$ becomes large, and the value of the low side pressure variance $V_L$ becomes large.

Therefore, even when the flow rate becomes large, the value of the diagnosis variable Z1, the value of the diagnosis variable Z2, the value of the diagnosis variable Z3, the value of the diagnosis variable Z4 and the value of the diagnosis variable Z5 are hardly varied respectively.

By the above-described, the embodiment of FIG. 1 can respectively diagnose blockage of the high pressure impulse line 31 and blockage of the low pressure impulse line 32 simply and accurately without being influenced by the flow rate of the process. Similarly, the method of diagnosing blockage of FIG. 2 can respectively diagnose blockage of the high pressure side impulse line 31 and blockage of the low pressure side impulse line 32 simply and accurately without being influenced by the flow rate of the process.

Further, separately from the above-described embodiment, an explanation will be given of a case (not illustrated) in which the constituent elements in which the low side pressure calculating section 67, the low side pressure fluctuation calculating section 68, the low side pressure variance calculating section 69, the second rate calculating section 72, the third rate calculating section 73, the fourth rate calculating section 74, the fifth rate calculating section 75, the first product calculating section 76, the second product calculating section 77, the second determining section 82, the third determining section 83, the fourth determining section 84, the fifth determining section 85, the sixth determining section 86, the seventh determining section 87, the first storing section 91, the second storing section 92 are deleted in the embodiment of FIG. 1.

That is, the embodiment at this occasion is formed only by the configuration according to the first rate calculating section 71.

Further, the embodiment at this occasion can determine blockage of the high side pressure impulse line 31 or blockage of the low pressure side impulse line 32 based on the value of the diagnosis variable Z1 similar to the embodiment of FIG. 1. Therefore, also in this case, blockage can simply and accurately be diagnosed without being influenced by the flow rate of the process. However, blockage of both of the high pressure side impulse line 31 and the low pressure side impulse line 32 cannot be determined.

Further, separately from the above-described embodiments, an explanation will be given of a case (not illustrated) in which constituent elements of the high side pressure calculating section 64, the high side pressure fluctuation calculating section 65, the high side pressure variance calculating section 66, the first rate calculating section 71, the third rate calculating section 73, the fourth rate calculating section 74, the fifth rate calculating section 75, the first product calculating section 76, the second product calculating section 77, the first determining section 81, the third determining section 83, the fourth determining section 84, the fifth determining section 85, the sixth determining section 86, the seventh determining section 87, the first storing section 91 and the second storing section 92 are deleted in the embodiment of FIG. 1.

That is, the embodiment at this occasion is formed only by the configuration according to the second rate calculating section 72.

Further, the embodiment at this occasion can determine blockage of the high pressure impulse line 31 or blockage of the low pressure side impulse line 32 based on the value of the diagnosis variable Z2 similar to the embodiment of FIG. 1. Therefore, also in this case, blockage can be determined simply and accurately without being influenced by the flow rate of the process. However, blockage of both the high pressure impulse line 31 and the low pressure impulse line 32 cannot be determined.

Further, separately from the above-described embodiments, an explanation will be given of a case (not illustrated) in which constituent elements of the differential pressure calculating section 61, the differential fluctuation calculating section 62, the differential pressure variance calculating section 63, the first rate calculating section 71, the second rate calculating section 72, the fourth rate calculating section 74, the fifth rate calculating section 75, the first product calculating section 76, the second product calculating section 77, the first determining section 81, the second determining section 82, the fourth determining section 84, the fifth determining section 85, the sixth determining section 86, the seventh determining section 87, the first storing section 91 and the second storing section 92 are deleted in the embodiment of FIG. 1.

That is, the embodiment at this occasion is formed only by the configuration according to the third rate calculating section 73.

Further, the embodiment at this occasion can determine blockage of the high pressure side impulse line 31 or blockage of the low pressure side impulse line 32 based on the value of the diagnosis variable Z3 similar to the embodiment of FIG. 1. Therefore, also in this case, blockage can simply and accurately be diagnosed without being influenced by the flow rate of the process. However, blockage of both the high pressure side impulse line 31 and the low pressure side impulse line 32 cannot be determined.

Further, separately from the above-described embodiments, an explanation will be given of a case (not illustrated) in which constituent elements of the first rate calculating section 71, the second rate calculating section 72, the third rate calculating section 73, the fifth rate calculating section 75, the first product calculating section 76, the second product calculating section 77, the first determining section 81, the second determining section 82, the third determining section 83, the fifth determining section 85, the sixth determining section 86, the seventh determining section 87, the first storing section 91 and the second storing section 92 are deleted in the embodiment of FIG. 1.

That is, the embodiment at this occasion is formed only by the configuration according to the fourth rate calculating section 74.

Further, the embodiment at this occasion can determine blockage of the high pressure side impulse line 31 or blockage of the low pressure side impulse line 32 based on the value of the diagnosis variable Z4 similar to the embodiment of FIG. 1. Therefore, also in this case, blockage can simply and accurately be diagnosed without being influenced by the flow rate of the process. However, blockage of both the high pressure side impulse line 31 and the low pressure side impulse line 32 cannot be determined.

Further, separately from the above-described embodiments, an explanation will be given of a case (not illustrated) in which constituent elements of the first rate calculating section 71, the second rate calculating section 72, the third rate calculating section 73, the fourth rate calculating section 74, the first product calculating section 76, the second product calculating section 77, the first determining section 81, the second determining section 82, the third determining section 83, the fourth determining section 84, the sixth determining section 86, the seventh determining section 87, the first storing section 91 and the second storing section 92 are deleted in the embodiment of FIG. 1.

That is, the embodiment at this occasion is formed only by the configuration according to the fifth rate calculating section 75.

Further, the embodiment at this occasion can determine blockage of the high pressure side impulse line 31 or blockage of the low pressure side impulse line 32 based on the value of the diagnosis variable Z5 similar to the embodiment of FIG. 1. Therefore, also in this case, blockage can simply and accurately be diagnosed without being influenced by the flow rate of the process. However, blockage of both the high pressure side impulse line 31 and the low pressure side impulse line 32 cannot be determined.

Further, separately from the above-described embodiments, an explanation will be given of a case (not illustrated) in which constituent elements of the first rate calculating section 71, the second rate calculating section 72, the third rate calculating section 73, the fourth rate calculating section 74, the fifth rate calculating section 75, the second product calculating section 77, the first determining section 81, the second determining section 82, the third determining section 83, the fourth determining section 84, the fifth determining section 85, the seventh determining section 87 and the second storing section 92 are deleted in the embodiment of FIG. 1.

That is, the embodiment at this occasion is formed only by the configuration according to the first rate calculating section 76.

Further, the embodiment at this occasion can determine blockage of both the high pressure side impulse line 31 and the low pressure side impulse line 32 based on the value of the first variable Z6 similar to the embodiment of FIG. 1. Therefore, also in this case, blockage can simply and accurately be diagnosed without being influenced by the flow rate of the process. However, blockage of either one of blockage of the high pressure side impulse line 31 or blockage of the low pressure side impulse line 32 cannot be determined.

Further, separately from the above-described embodiments, an explanation will be given of a case (not illustrated) in which constituent elements of the first rate calculating section 71, the second rate calculating section 72, the third rate calculating section 73, the fourth rate calculating section 74, the fifth rate calculating section 75, the first product calculating section 76, the first determining section 81, the second determining section 82, the third determining section 83, the fourth determining section 84, the fifth determining section 85, the sixth determining section 86 and the first storing section 91 are deleted in the embodiment of FIG. 1.

That is, the embodiment at this occasion is formed only by the configuration according to the second product calculating section 77.

Further, the embodiment at this occasion can determine blockage of both the high pressure side impulse line 31 and the low pressure side impulse line 32 based on the value of the second variable Z7 similar to the embodiment of FIG. 1. Therefore, also in this case, blockage can simply and accurately be diagnosed without being influenced by the flow rate of the process. However, blockage of either one of blockage of the high pressure side impulse line 31 or blockage of the low pressure side impulse line 32 cannot be determined.

Further, separately from the above-described embodiments, in the third rate calculating section 73 of the embodiment of FIG. 1, a diagnosis variable Z3' is calculated by executing calculation of Equation (17) shown below.

$$Z3' = 1/Z3 = V_L/V_H \tag{17}$$

Further, the third determining section 83 is substantially constructed by a configuration equivalent to that of the embodiment of FIG. 1 even when blockage of the high pressure side impulse line 31 or blockage of the low pressure side impulse line 32 is determined based on the value of the diagnosis variable Z3', and achieves equivalent operation and effect.

As described above, the embodiment is not limited to the above-described embodiments but includes modifications of equations of a number of diagnosis variables within the range not deviated from an essence thereof.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A pressure detector for detecting a high side pressure from a high pressure side impulse line and a low side pressure from a low pressure side impulse line, the pressure detector comprising:

a differential pressure calculating section for calculating a differential pressure signal (X) based on a differential pressure of the high side pressure and the low side pressure;

a differential pressure fluctuation calculating section for calculating a differential pressure fluctuation ($F_X(i)$) from the differential pressure signal (X);

a differential pressure variance calculating section for calculating a differential pressure variance ($V_X$) from the differential pressure fluctuation ($F_X(i)$);

a high side pressure calculating section for calculating a high side pressure signal ($Y_H$) based on the high side pressure;

a high side pressure fluctuation calculating section for calculating a high side pressure fluctuation ($F_H(i)$) from the high side pressure signal ($Y_H$);

a high side pressure variance calculating section for calculating a high side pressure variance ($V_H$) from the high side pressure fluctuation ($F_H(i)$);

a low side pressure calculating section for calculating a low side pressure signal ($Y_L$) based on the low side pressure;

a low side pressure fluctuation calculating section for calculating a low side pressure fluctuation ($F_L(i)$) from the low side pressure signal ($Y_L$);

a low side pressure variance calculating section for calculating a low side pressure variance ($V_L$) from the low side pressure fluctuation ($F_L(i)$);

a first rate calculating section for calculating a first diagnosis variable (Z1) according to a ratio of the high side pressure variance ($V_H$) to the differential pressure variance ($V_X$);

a second rate calculating section for calculating a second diagnosis variable (Z2) according to a ratio of the low side pressure variance ($V_L$) to the differential pressure variance ($V_x$);

a third rate calculating section for calculating a third diagnosis variable (Z3) according to a ratio of the high side pressure variance ($V_H$) to the low side pressure variance ($V_L$);

a fourth rate calculating section for calculating a fourth diagnosis variable (Z4) according to a ratio of the high side pressure variance ($V_H$) to a sum of the low side pressure variance ($V_L$) and the differential pressure variance ($V_X$);

a fifth rate calculating section for calculating a fifth diagnosis variable (Z5) according to a ratio of the low side pressure variance ($V_L$) to a sum of the high side pressure variance ($V_H$) and the differential pressure variance ($V_X$);

a first determining section for determining blockage of the high pressure side impulse line or blockage of the low pressure side impulse line based on a value of the first diagnosis variable (Z1);

a second determining section for determining blockage of the high pressure side impulse line or blockage of the low pressure side impulse line based on a value of the second diagnosis variable (Z2);

a third determining section for determining blockage of the high pressure side impulse line or blockage of the low pressure side impulse line based on a value of the third diagnosis variable (Z3);

a fourth determining section for determining blockage of the high pressure side impulse line or blockage of the low pressure side impulse line based on a value of the fourth diagnosis variable (Z4); and a fifth determining section for determining blockage of the high pressure side impulse line or blockage of the low pressure side impulse line based on a value of the fifth diagnosis variable (Z5).

2. The pressure detector according to claim 1, wherein the differential pressure calculating section has a constant ($A_D$) of a calculating equation in which the differential pressure signal (X) is not influenced by a change in the high side pressure and a change in the low side pressure, the high side pressure calculating section has a constant ($A_H$) of a calculating equation in which the high side pressure signal ($Y_X$) is not influenced by the change in the low side pressure, and the low side pressure calculating section has a constant ($A_L$) of a calculating equation in which the low side pressure signal ($Y_L$) is not influenced by the change in the high side pressure.

3. The pressure detector according to claim 2, further comprising:

a first product calculating section for calculating a first variable (Z6) according to a product of the differential pressure variance ($V_X$), the high pressure side variance ($V_H$) and the low side pressure variance ($V_L$);

a sixth determining section for determining blockage of both the high pressure side impulse line and the low pressure side impulse line based on a value of the first variable (Z6); and a first storing section for storing a value (Z6s) of the first variable (Z6) when the blockage is not occurred, wherein the sixth determining section determines the blockage of both the high pressure side impulse line and the low pressure side impulse line based on a value of a sixth diagnosis variable (Z6/Z6s) according to a ratio of the first variable (Z6) to the value (Z6s) stored in the first storing section.

4. The pressure detector according to claim 2, further comprising:

a second product calculating section for calculating a second variable (Z7) according to a product of the differential pressure fluctuation ($F_X(i)$), the high side pressure fluctuation ($F_H(i)$) and the low side pressure fluctuation ($F_L(i)$); and a seventh determining section for determining blockage of both of the high pressure side impulse line and the low pressure side impulse line based on a value of the second variable (Z7); and a second storing section for storing a value (Z7s) of the second variable (Z7) when the blockage is not occurred, wherein the seventh determining section determines the blockage of both the high pressure side impulse line and the low pressure side impulse line based on a value of a seventh diagnosis variable (Z7/Z7s) according to a ratio of the second variable (Z7) to the value (Z7s) stored in the second storing section.

5. The pressure detector according to claim 2, further comprising:

at least two oscillating-type-sensors each of which detects a pressure and which are formed on a element; and a counter for counting a frequency ($F_c$) of one output of the oscillating-type-sensors and a frequency ($F_r$) of other output of the oscillating-type-sensors respectively, wherein the differential pressure calculating section, the high side pressure calculating section and the low side pressure calculating section satisfy equations including $$X = (F_C/F_{co})^2 - 1 - A_D \cdot \{(F_r/F_{ro})^2 - 1\} \quad \text{(A)}$$

$$Y_H = (F_C/F_{co})^2 - 1 + A_H \cdot \{(F_r/F_{ro})^2 - 1\} \quad \text{(B)}$$

$$Y_L = (F_C/F_{co})^2 - 1 + A_L \cdot \{(F_r/F_{ro})^2 - 1\} \quad \text{(C)}$$

where

X is the differential pressure signal, $Y_H$ is the high side pressure signal, $Y_L$ is the low side pressure signal, $A_D$, $A_H$ and $A_L$ are the constants, $F_c$ is the frequency of the output of the one of the oscillating-type-sensors, $F_{co}$ is a frequency of the output of the one of the oscillating-type-sensors in a state of a reference pressure, $F_r$ is the frequency of the output of the other of the oscillating-type-sensors, and $F_{ro}$ is a frequency of the output of the other of the oscillating-type-sensors in the state of the reference pressure.

6. The pressure detector according to claim 1, wherein the pressure fluctuation ($F_X(i)$) includes a difference between a differential pressure signal (X(i)) generated at i th time and a differential pressure signal ((X(i-1)) generated at (i-1) th time, the high side pressure fluctuation ($F_H(i)$) includes a difference between a high side pressure signal ($Y_H(i)$) generated at i th time and a high side pressure signal ($Y_H(i-1)$) generated at (i-1) th time, the low side pressure fluctuation ($F_L(i)$) includes a difference between a low side pressure signal ($Y_L(i)$) generated at i th time and a low side pressure signal (YL(i-1)) generated at (i-1) th time, the differential pressure variance ($V_X$) includes a mean square of the differential pressure fluctuations ($F_X(i)$) for N samples, the high side pressure variance ($V_H$) includes a mean square of the high side pressure fluctuations ($F_H(i)$) for N samples, and the low side pressure variance ($V_L$) includes a mean square of the low side pressure fluctuations ($F_L(i)$) for N samples.

7. A pressure detector for detecting a high side pressure from a high pressure side impulse line and a low side pressure from a low pressure side impulse line, the pressure detector comprising:

a differential pressure calculating section for calculating a differential pressure signal based on a differential pressure between the high side pressure and the low side pressure;

a differential pressure fluctuation calculating section for calculating a differential pressure fluctuation from the differential pressure signal;

a differential pressure variance calculating section for calculating a differential pressure variance from the differential pressure fluctuation;

a high side pressure calculating section for calculating a high side pressure signal based on the high side pressure;

a high side pressure fluctuation calculating section for calculating a high side pressure fluctuation from the high side pressure signal;

a high side pressure variance calculating section for calculating a high side pressure variance from the high side pressure fluctuation;

a rate calculating section for calculating a diagnosis variable according to a ratio of the high side pressure variance to the differential pressure variance; and a determining section for determining blockage of the high pressure side impulse line or blockage of the low pressure side impulse line based on a value of the diagnosis variable.

8. A pressure detector for detecting a high side pressure from a high pressure side impulse line and a low side pressure from a low pressure side impulse line, the pressure detector comprising:

a differential pressure calculating section for calculating a differential pressure signal based on a differential pressure between the high side pressure and the low side pressure;

a differential pressure fluctuation calculating section for calculating a differential pressure fluctuation from the differential pressure signal;

a differential pressure variance calculating section for calculating a differential pressure variance from the differential pressure fluctuation;

a low side pressure calculating section for calculating a low side pressure signal based on the low side pressure;

a low side pressure fluctuation calculating section for calculating a low side pressure fluctuation from the low side pressure signal;

a low side pressure variance calculating section for calculating a low side pressure variance from the low side pressure fluctuation;

a rate calculating section for calculating a diagnosis variable according to a ratio of the low side pressure variance to the differential pressure variance; and a determining section for determining blockage of the high pressure side impulse line or blockage of the low pressure side impulse line based on a value of the diagnosis variable.

9. A pressure detector for detecting a high side pressure from a high pressure side impulse line and a low side pressure from a low pressure side impulse line, the pressure detector comprising:

a high side pressure calculating section for calculating a high side pressure signal based on the high side pressure;

a high side pressure fluctuation calculating section for calculating a high side pressure fluctuation from the high side pressure signal;

a high side pressure variance calculating section for calculating a high side pressure variance from the high side pressure fluctuation;

a low side pressure calculating section for calculating a low side pressure signal based on the low side pressure;

a low side pressure fluctuation calculating section for calculating a low side pressure fluctuation from the low side pressure signal;

a low side pressure variance calculating section for calculating a low side pressure variance from the low side pressure fluctuation;

a rate calculating section for calculating a diagnosis variable according to a ratio of the high side pressure variance to the low side pressure variance; and a determining section for determining blockage of the high pressure side impulse line or blockage of the low pressure side impulse line based on a value of the diagnosis variable.

10. A pressure detector for detecting a high side pressure from a high pressure side impulse line and a low side pressure from a low pressure side impulse line, the pressure detector comprising:

a differential pressure calculating section for calculating a differential pressure signal based on a differential pressure between the high side pressure and the low side pressure;

a differential pressure fluctuation calculating section for calculating a differential pressure fluctuation from the differential pressure signal;

a differential pressure variance calculating section for calculating a differential pressure variance from the differential pressure fluctuation;

a high side pressure calculating section for calculating a high side pressure signal based on the high side pressure;

a high side pressure fluctuation calculating section for calculating a high side pressure fluctuation from the high side pressure signal;

a high side pressure variance calculating section for calculating a high side pressure variance from the high side pressure fluctuation;

a low side pressure calculating section for calculating a low side pressure signal based on the low side pressure;

a low side pressure fluctuation calculating section for calculating a low side pressure fluctuation from the low side pressure signal;

a low side pressure variance calculating section for calculating a low side pressure variance from the low side pressure fluctuation;

a variable calculating section for calculating a variable based on the high side pressure variance, the low side pressure variance and the differential pressure variance; and a determining section for determining at least one blockage of the high pressure side impulse line and blockage of the low pressure side impulse line based on a value of the variable.

11. The pressure detector according to claim 10, wherein the variable calculating section calculates the variable according to a ratio of the high side pressure variance to a sum of the low side pressure variance and the differential pressure variance.

12. The pressure detector according to claim 10, wherein the variable calculating section calculates the variable according to a ratio of the low side pressure variance to a sum of the high side pressure variance and the differential pressure variance.

13. The pressure detector according to claim 10, wherein the variable calculating section calculates the variable according to a product of the differential pressure variance, the high side pressure variance and the low side pressure variance, and the determining section determines the blockage of both the high pressure side impulse line and the low pressure side impulse line based on a value of the variable.

14. A pressure detector for detecting a high side pressure from a high pressure side impulse line and a low side pressure from a low pressure side impulse line, the pressure detector comprising:

a differential pressure calculating section for calculating a differential pressure signal based on a differential pressure between the high side pressure and the low side pressure;

a differential pressure fluctuation calculating section for calculating a differential pressure fluctuation from the differential pressure signal;

a high side pressure calculating section for calculating a high side pressure signal based on the high side pressure;

a high side pressure fluctuation calculating section for calculating a high side pressure fluctuation from the high side pressure signal;

a low side pressure calculating section for calculating a low side pressure signal based on the low side pressure;

a low side pressure fluctuation calculating section for calculating a low side pressure fluctuation from the low side pressure signal;

a product calculating section for calculating a variable according to a product of the differential pressure fluctuation, the high side pressure fluctuation and the low side pressure fluctuation; and a determining section for determining blockage of both the high pressure side impulse line and the low pressure side impulse line based on a value of the variable.

15. A method of diagnosing blockage of impulse lines connected to a pressure detector for detecting a high side pressure and a low side pressure, the method comprising:

calculating a differential pressure signal based on a differential pressure between the high side pressure and the low side pressure;

calculating a differential pressure fluctuation from the differential pressure signal;

calculating a differential pressure variance from the differential pressure fluctuation;

calculating a high side pressure signal based on the high side pressure;

calculating a high side pressure fluctuation from the high side pressure signal;

calculating a high side pressure variance from the high side pressure fluctuation;

calculating a diagnosis variable according to a ratio of the high side pressure variance to the differential pressure variance; and determining blockage of a high pressure side impulse line or blockage of a low pressure side impulse line based on a value of the diagnosis variable, wherein when the value of the diagnosis variable is smaller than a predetermined value, the blockage of the high pressure side impulse line is determined, and wherein when the value of the diagnosis variable is larger than a predetermined value, the blockage of the low pressure side impulse line is determined.

16. A method of diagnosing blockage of impulse lines connected to a pressure detector for detecting a high side pressure and a low side pressure, the method comprising:

calculating a differential pressure signal based on a differential pressure between the high side pressure and the low side pressure;

calculating a differential pressure fluctuation from the differential pressure signal;

calculating a differential pressure variance from the differential pressure fluctuation;

calculating a low side pressure signal based on the low side pressure; calculating a low side pressure fluctuation from the low side pressure signal;

calculating a low side pressure variance from the low side pressure fluctuation;

calculating a diagnosis variable according to a ratio of the low side pressure variance to the differential pressure variance; an determining blockage of a high pressure side impulse line or blockage of a low pressure side impulse line based on a value of the diagnosis variable, wherein when the value of the diagnosis variable is smaller than a predetermined value, the blockage of the low pressure side impulse line is determined, and when the value of the diagnosis variable is larger than a predetermined value, the blockage of the high pressure side impulse line is determined.

17. A method of diagnosing blockage of impulse lines connected to a pressure detector for detecting a high side pressure and a low side pressure, the method comprising:

calculating a high side pressure signal based on the high side pressure;

calculating a high side pressure fluctuation from the high side pressure signal;

calculating a high side pressure variance from the high side pressure fluctuation;

calculating a low side pressure signal based on the low side pressure;

calculating a low side pressure fluctuation from the low side pressure signal;

calculating a low pressure variance from the low side pressure fluctuation;

calculating a diagnosis variable according to a ratio of the high side pressure variance to the low side pressure variance; and determining blockage of a high pressure side impulse line or blockage of a low pressure side impulse line based on a value of the diagnosis variable, wherein when the value of the diagnosis variable is smaller than a predetermined value, the blockage of the high pressure side impulse line is determined, and wherein when the value of the diagnosis variable is larger than a predetermined value, the blockage of the low pressure side impulse line is determined.

18. A method of diagnosing blockage of impulse lines connected to a pressure detector for detecting a high side pressure and a low side pressure, the method comprising:

calculating a differential pressure signal based on a differential pressure between the high side pressure and the low side pressure;

calculating a differential pressure fluctuation from the differential pressure signal;

calculating a differential pressure variance from the differential pressure fluctuation;

calculating a high side pressure signal based on the high side pressure;

calculating a high side pressure fluctuation from the high side pressure signal;

calculating a high side pressure variance from the high side pressure fluctuation;

calculating a low pressure side signal based on the low side pressure;

calculating a low side pressure fluctuation from the low side pressure signal;

calculating a low side pressure variance from the low side pressure fluctuation;

calculating a variable based on the differential pressure variance, the high side pressure variance and the low side pressure variance; and determining at least one blockage of a high pressure side impulse line and blockage of a low pressure side impulse line based on a value of the variables, wherein any one of a first variable according to a ratio of the high side pressure variance to a sum of the low side pressure variance and the differential pressure variance, a second variable according to a ratio of the low side pressure variance to a sum of the high side pressure variance and the differential pressure variance, or a third variable according to a product of the differential pressure variance, the high side pressure variance and the low side pressure variance is calculated as the variable, and when the value of the variable is not included in predetermined values, at least one blockage of the high pressure side impulse line and blockage of the low pressure side impulse line is determined.

19. The method according to claim 18, wherein the first variable according to the ratio of the high side pressure variance to the sum of the low side pressure variance and the differential pressure variance is calculated, when the value of the variable is smaller than a predetermined value, the blockage of the high pressure side impulse line is determined, and when the value of the variable is larger than a predetermined value, the blockage of the low pressure side impulse line is determined.

20. The method according to claim 18, wherein the second variable according to the ratio of the low side pressure variance to the sum of the high side pressure variance and the differential pressure variance is calculated, when the value of the variable is smaller than a predetermined value, the blockage of the low pressure side impulse line is determined, and when the value of the variable is larger than a predetermined value, the blockage of the high pressure side impulse line is determined.

21. The method according to claim 18, wherein the variable according to the product of the differential pressure variance, the high side pressure variance and the low side pressure variance is calculated, the blockage of both the high pressure side impulse line and the low pressure side impulse line is determined based on the value of the variable, when the value of the variable is smaller than a predetermined value, the blockage of both the low pressure side impulse line and the low pressure impulse line is determined.

22. A method of diagnosing blockage of impulse lines connected to a pressure detector for detecting a high side pressure and a low side pressure, the method comprising:

calculating a differential pressure signal based on a differential pressure between the high side pressure and the low side pressure;

calculating a differential pressure fluctuation from the differential pressure signal;

calculating a high side pressure signal based on the high side pressure;

calculating a high side pressure fluctuation from the high side pressure signal;

calculating a low side pressure signal based on the low side pressure;

calculating a low side pressure fluctuation from the low side pressure signal;

calculating a variable according to a product of the differential pressure fluctuation, the high side pressure fluctuation and the low side pressure fluctuation; and determining blockage of both a high pressure side impulse line and a low pressure side impulse line based on a value of the variable, wherein a value of the variable when there is no blockage is stored, the blockage of both the high pressure side impulse line and the low pressure side impulse line is determined based on a value of a diagnosis variable according to a ratio of the value of the variable to the stored value, and when the value of the diagnosis variable is smaller than a predetermined value, the blockage of both the high pressure side impulse line and low pressure side impulse line is determined.

* * * * *